Figure 1:
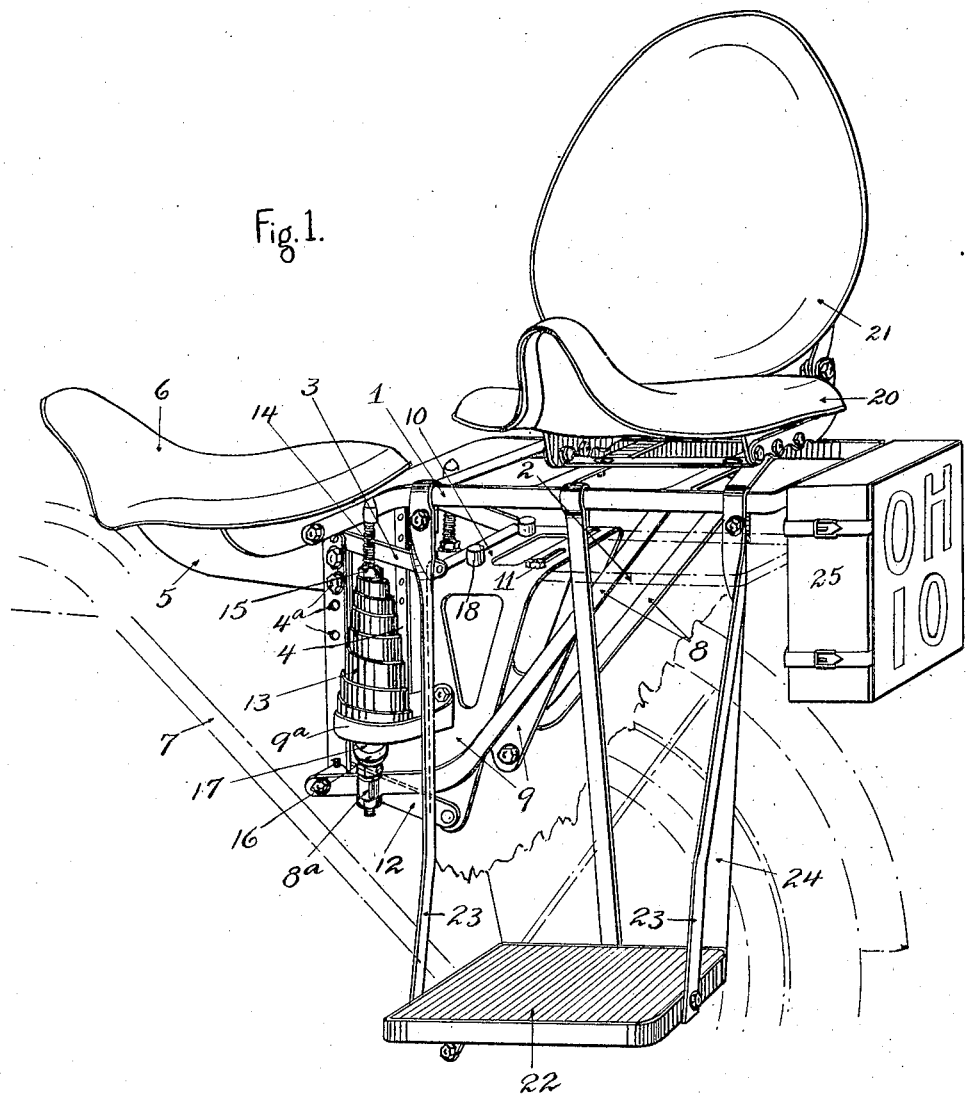

Dec. 4, 1923.  1,476,651
G. F. SHEPHERD
SPRING SUSPENSION DEVICE FOR MOTOR CYCLES AND LIKE VEHICLES
Filed April 23, 1923  3 Sheets-Sheet 1

Dec. 4, 1923.  1,476,651
G. F. SHEPHERD
SPRING SUSPENSION DEVICE FOR MOTOR CYCLES AND LIKE VEHICLES
Filed April 23, 1923   3 Sheets-Sheet 2

Inventor:-
George F. Shepherd,
by Fowler and Smith,
Attys.

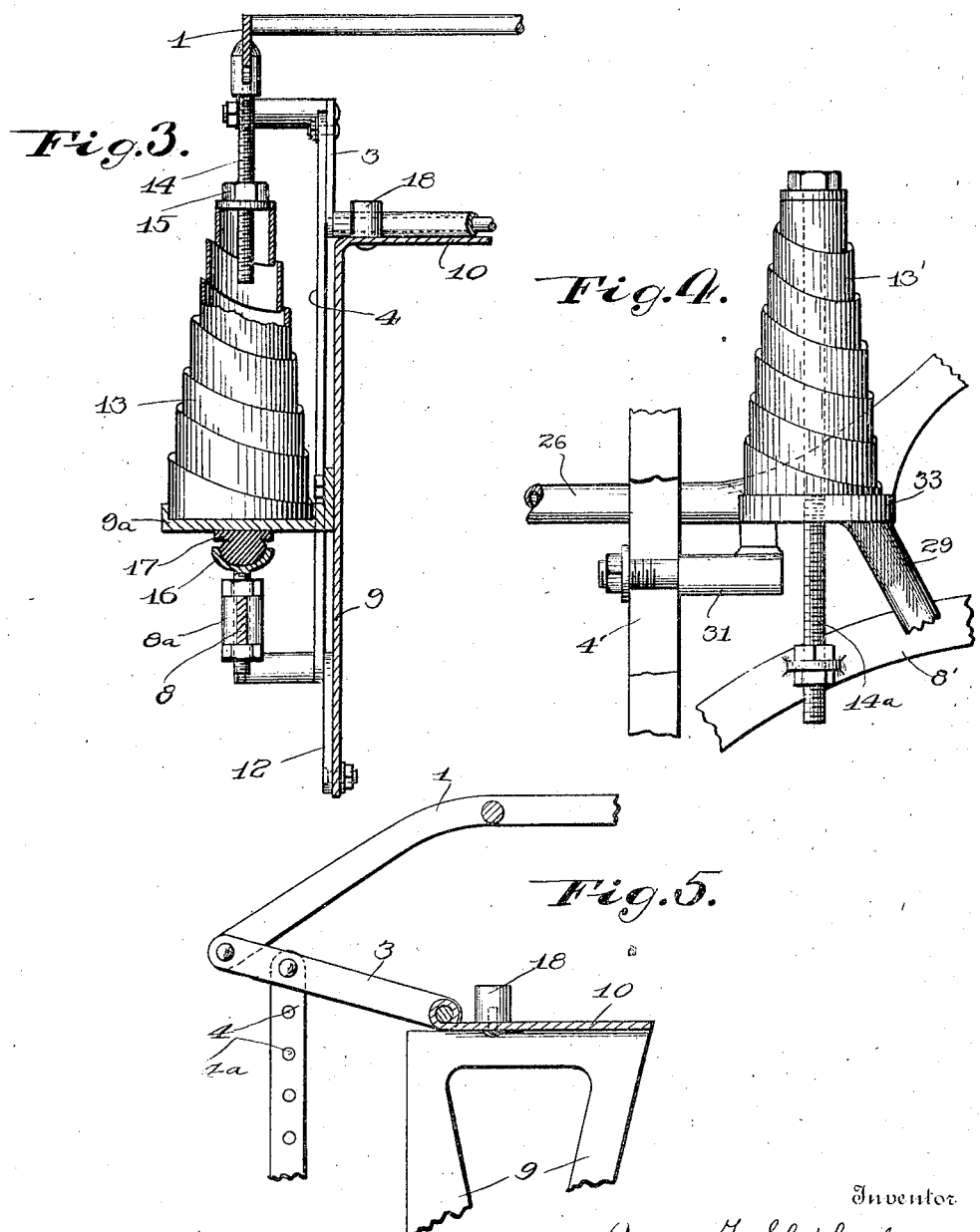

Patented Dec. 4, 1923.

1,476,651

UNITED STATES PATENT OFFICE.

GEORGE FREDERICK SHEPHERD, OF EDGBASTON, BIRMINGHAM, ENGLAND.

SPRING SUSPENSION DEVICE FOR MOTOR CYCLES AND LIKE VEHICLES.

Application filed April 23, 1923. Serial No. 634,004.

*To all whom it may concern:*

Be it known that I, GEORGE FREDERICK SHEPHERD, subject of the King of Great Britain, of 12 Yew Tree Road, Edgbaston, Birmingham, England, have invented certain new and useful Improvements in and Relating to Spring Suspension Devices for Motor Cycles and like Vehicles, (for which I have filed application in England November 5, 1921, No. 29,459/21), of which the following is a specification.

This invention comprises improvements in spring suspension devices for motor cycles and like vehicles and has for its object, in the first place, to provide a spring carrier which may be fitted on to a standard motor cycle frame either in addition to, or in lieu of the rigid carrier generally provided therewith, and, in the second place, so to adapt such spring carrier that tool boxes and the like may be mounted thereon and thus have the benefit of the spring suspension, and also, if desired, to mount the saddle on such spring carrier, and thus obviate the necessity for a separate spring suspension for such saddle as is employed in machines at present used.

It is a well-known fact that with rigid carriers as at present made, not only are the tool boxes and the contents thereof subject, when the machine is in use, to a great amount of vibration and road-shock which damages them and renders them useless unless special precautions are taken, but also if the carrier is used for pillion riding, it forms a very uncomfortable and unsatisfactory seat for the rider. In fact, it is usually fitted with a spring seat in addition, such as is well-known in the trade. The advantages of a carrier which itself is spring supported will therefore be obvious, even if it is used only for the support of luggage, etc., when travelling.

According to my invention the carrier is mounted upon the machine through the medium of a system of parallel-motion springing. The rider's saddle may be mounted upon the spring supported carrier and the usual spring underwork thereof dispensed with. Further, an auxiliary saddle or seat may be mounted upon the carrier behind the rider's saddle for pillion riding and also the toolbags, rearlight, etc., as may be required. The invention may be applied either as a unit attachable to a standard frame, or it may be applied to the frame itself.

It will be seen then that in my invention there is no relative motion between the rider of the machine and whatever is being carried upon the carrier,—whether such latter be a pillion rider, or a suitcase, or other luggage, i. e., the rider's seat and the carrier always move substantially the same distance and remain spaced the same distance from each other. This is a most important advantage, resulting from the parallel-motion springing which absolutely constrains a perfectly equal motion at any point of the spring supported portion relatively to the rigid portion of the frame, no matter what shock may occur at the road-wheels.

In order that the invention may be readily understood and carried into practice, I will describe two embodiments in one of which a spring carrier is combined with the rider's saddle as a single unit adapted to be fitted on to the rigid carrier supplied with the machine.

In the other embodiment my improvements are applied to the frame of the machine itself and not arranged as an attachment thereto. These two embodiments are illustrated in the accompanying drawings, in which—

Figure 2:
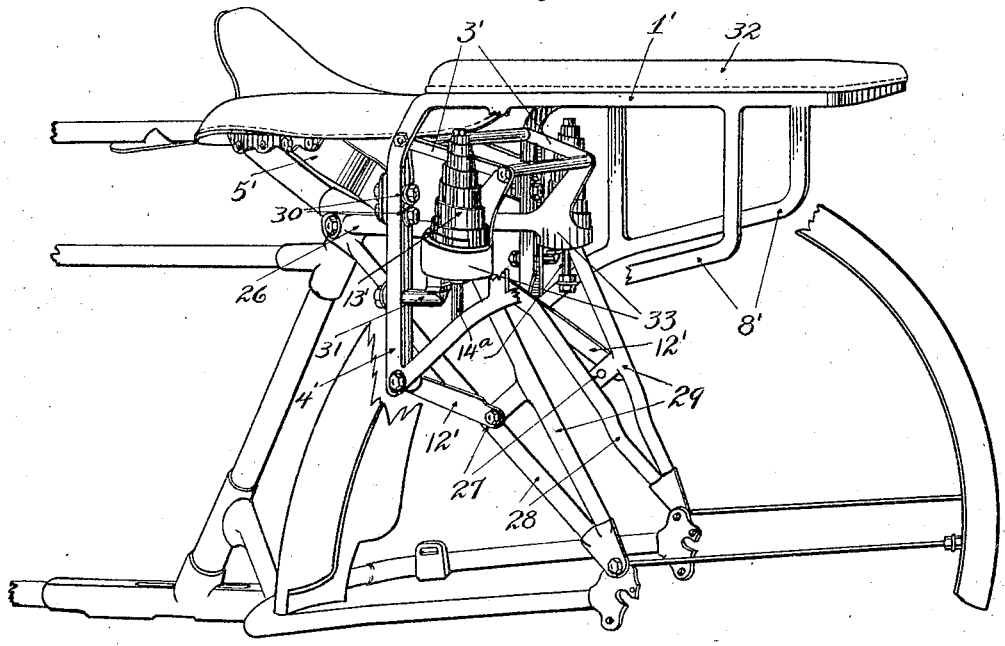

Fig. 1 is a perspective view of the embodiment adapted to be fitted as an attachment on the rigid carrier of the vehicle, Fig. 2 is a perspective side elevation of the embodiment applied directly to the frame of the vehicle, Fig. 3 is an enlarged fragmental view showing the details of the spring suspension means disclosed in Fig. 1, Fig. 4 is an enlarged fragmental view showing the details of the spring suspension means disclosed in Fig. 2, and Fig. 5 is an enlarged fragmental view showing the method of mounting the attachment shown in Fig. 1.

In the embodiment of the invention shown in Fig. 1 the portion of the spring carrier 1 which is adapted to support luggage etc. is of the usual construction, and is supported horizontally above the rigid carrier 2 with sufficient clearance between the two to enable adequate springing to take place. This carrier portion 1 is pivotally connected to the forward ends of links 3, which are pivotally connected near their front ends to two downwardly depending legs 4 one at each side, and these legs 4 are of sufficient length to serve as links of a parallel-motion device. These legs 4 are provided also with a series of holes 4ª whereby brackets 5 projecting forwardly and supporting the rider's saddle 6 can be attached. By this means the level of the saddle 6 with respect to the carrier 1 and to the rigid frame of the machine 7 may be adjusted to suit the rider's requirements. At the rear, the carrier 1 is provided with downwardly sloping stays 8 suitably arranged to give the necessary support to the carrier, such stays being pivotally connected to the lower ends (or thereabout) of the downwardly depending legs 4 hereinbefore mentioned.

Parallel to these legs are two vertical brackets 9 depending from a clamping plate 10 which is bolted at 11 to the rigid frame carrier 2. To the upper and lower extremities of these brackets 9 are pivotally mounted links 3 and 12 of equal length, which in turn are pivoted at suitable points to the downwardly depending legs 4 in such a manner that the vertical brackets 9, the legs 4, and the links 3 and 12 constitute a parallelogram whereby motion of the carrier and saddle is constrained so that both move substantially the same distance and remain spaced the same distance apart. It is to be noted that the bearing for the rear ends of the links 3 is located at a point between the carrier and the main rider's seat which is carried thereby. The method employed to pivotally connect the links 3 to the clamping plate 10 is best illustrated in Fig. 5 of the accompanying drawings. The spring suspension of the carrier is provided by a shock-absorbing device which is preferably constituted by two volute or spiral leaf springs 13, one on each side. The lower end of each of these springs 13 is supported by a laterally extending bracket or other suitable member 9ª attached to the corresponding vertical bracket 9 on the rigid carrier 2, and such lower end of the spring may therefore be considered as being rigid with respect to the bracket 9 and the frame 7 of the machine. The other or upper ends of each spring are carried by the movable member, this being preferably achieved by means of vertical screwed thrust rods 14 fixed to the spring carrier member 1. In order to allow for adjustment of the spring 13 to enable its resilience to be increased or decreased to suit the total weight which is to be supported by the carrier 1, an adjusting nut 15 is provided, as clearly shown in Fig. 3. Further, bosses 8ª on the legs 8 are provided to carry a screwed stop 16. This stop abuts against a rubber buffer 17 mounted on the under surface of the lug 9ª and can be adjusted vertically to locate the "no load" position of the movable carrier 1 relatively to the rigid frame.

To prevent "bottoming", rubber buffers 18 are mounted on the top plate 10 connecting the brackets 9, which prevent the movable carrier 1 coming into actual metallic contact with the rigid framework at any time.

In the unit illustrated, an auxiliary saddle or seat 20, with hinged back rest 21, is bolted suitably to the carrier, 1. Furthermore, a footrest 22 supported by legs 23 hooked over and bolted to the carrier framework 1 is shown so as to ensure the greatest possible comfort. A dressguard or mudshield 24 protects the pillion-rider's dress.

The rear light, although not shown, would naturally be mounted on the movable carrier as well as the toolbag 25.

Referring specifically to the operation of the form of my device shown in Figs. 1 and 3 of the drawings, it will be seen that the device is adapted for attachment as a complete unit to the rigid carrier 2, to which it is secured by bolts 11. The bracket 5 supporting the rider's seat 6 is attached at the desired height, to the legs 4, by means of suitable clamping bolts passing through holes 4ª. The links 3 and 12, and legs 4 and brackets 9, together with the spring 13, constitute a system of parallel motion springing for resiliently supporting the rider's seat 6 and the movable carrier 1 so that there is a perfectly equal motion at any point of the spring supported portion relative to the rigid portion of the vehicle frame. As clearly shown in Fig. 3, the adjusting nuts 15 permit the adjustment of the spring 13 to enable the resiliency of the springs to be regulated. Further the provision of the stops 16 permit the adjustment of the attachment to locate the "no load" position of the vehicle by varying the distance between the stops 16 and the laterally extending bracket 9ª. In the embodiment shown in Fig. 2, the movable carrier 1' is of construction similar to that shown in the attachable unit, differing mainly in the fact that the thrust rods 14 (Fig. 1) are not attached to its upper members, but instead tension rods 14ª are attached to the legs 8' as clearly shown in Fig. 4 of the accompanying drawings. The parallel links 3' and 12' however, instead of being pivotally connected to depending brackets 9 (Fig. 1,) are carried by rigid arms 26 formed integrally with the frame and by fulcrum pins 27 respectively provided on the rear forks 28. Auxiliary brace members 29 are provided on the rear forks and at their junction with the rearwardly-extending arms 26 are formed into brackets 33, which are similar to the brackets 9ª in Figs. 1 and 3, and are rigid with the frame. These laterally extending brackets 33 are adapted to support the lower ends of the spiral leaf springs 13', one on each side of the vehicle. The vertical legs 4', which in this case are formed integrally with the carrier 1, are of duplex structure thereby providing vertical slots for the accommodation not only of the bolts 30 clamping the saddle brackets 5' to the carrier, but also of a vertically adjustably stop 31 suitably buffered to serve the same purpose as the buffers 17 in Fig. 1, by means of which the "no load" position of the movable carrier relative to the rigid frame is obtained.

In the illustration, a flat or slightly curved upholstered plate 32 is provided in lieu of the auxiliary saddle or seat 20. This is suitable either for pillion riding or for the attachment of luggage, etc. and can be bolted or otherwise attached in any suitable manner to the crossbars of the carrier 1' or elsewhere. It should be understood however that the auxiliary seat 20 and footrest 22 can be fitted in lieu if required.

Referring specifically to the operation of the form of the device disclosed in Figs. 2 and 4, it will be seen that the parallel links 3' and 4', and the auxiliary brace members 29 carrying the bracket 33 and springs 13', constitute a system of parallel-motion springing for resiliently supporting the rider's seat and the movable carrier 1', and that by the use of this construction there is no relative movement between the rider's seat and whatever is carried upon the said movable carrier. Such a system of parallel motion springing provides an equal motion at any point of the spring supported portion relative to the rigid portion of the frame.

It is to be understood that the forms of my invention shown and described herewith are to be taken as preferred examples of the same, and that various changes in the shape, size, and arrangement of parts may be resorted to without departing from the spirit of my invention or the scope of the subjoined claims.

I claim:—

1. A seat suspension device for motor cycles, and like vehicles, comprising in combination, a movable carrier; a main rider's seat mounted on said carrier; means for springing said carrier with respect to its mounting on the vehicle; and means for constraining the motion of the carrier and rider's seat so that the carrier and rider's seat always move the same distance and remain spaced the same distance from each other, said means including a fulcrum for the carrier located at a point between the said carrier and the seat carried thereby.

2. A seat suspension device for motor cycles, and like vehicles, comprising in combination, a movable carrier, a main rider's seat mounted on said carrier, a rigid mounting means for the movable carrier, parallel links between said mounting means and the carrier to constrain the motion of the carrier and of the seat thereon so that the carrier and rider's seat always move the same distance and remain spaced the same distance from each other, and spring means for resiliently resisting said motion.

3. A seat suspension device for motor cycles, and like vehicles, comprising in combination, a movable carrier; a main rider's seat adjustably mounted on said carrier; means for springing said carrier with respect to its mounting on the vehicle; means for adjusting said springing means; and means for constraining the motion of the carrier and seat so that the carrier and rider's seat always move the same distance and remain spaced the same distance from each other, said means including a fulcrum for the carrier located at a point between the said carrier and the seat carried thereby.

4. A spring suspension device for motor cycles, and like vehicles, comprising a movable carrier; an auxiliary seat mounted on the carrier; a main rider's seat also mounted on the said carrier; and a parallel motion springing device for constraining the motion of the auxiliary seat and the main rider's seat so that the two seats move the same distance and remain spaced the same distance from each other, said parallel motion springing device including a fulcrum for the carrier located at a point between the two seats.

5. An improved seat suspension device for motor cycles which is readily attachable as a unit to a vehicle, said device comprising a movable carrier, a main rider's saddle mounted on said carrier, a rigid attachment bracket having a bearing located at a point between the carrier and rider's seat, and a parallel motion springing device pivotally mounted on the bearing of the said bracket, whereby the carrier and the rider's seat are constrained to move so that both move the same distance and remain spaced the same distance apart.

6. An improved seat suspension device for motor cycles and like vehicles, which is readily attachable as a unit to a vehicle, said device comprising a movable carrier, a rider's saddle mounted on said carrier, a rigid attachment bracket above which said carrier is mounted, a pair of legs rigid with said bracket, a pair of links connecting the movable carrier to said rigid bracket, a pair of legs pivoted to said links, a second pair of links connecting said latter pair of legs to the legs rigid with the bracket, so that the motion of said carrier and of said saddle with respect to the rigid attachment bracket is a motion such that the carrier and saddle are constrained to move the same distance and remain spaced the same distance apart, and a springing device for resiliently resisting said motion.

7. An improved seat suspension device for motor cycles and like vehicles which is readily attachable as a unit to the vehicle, said device comprising a movable carrier, a rider's saddle mounted on said carrier, a rigid attachment bracket above which said carrier is mounted, a pair of depending legs rigid with said bracket, a pair of links connecting the movable carrier to said rigid bracket, a pair of depending legs pivoted to said links and to said carrier, a series of holes in said legs whereby said rider's saddle may be adjustably mounted to said carrier, a second pair of links connecting said latter pair of legs to the legs rigid with the bracket so that the motion of said carrier and of said saddle with respect to the rigid attachment bracket is a motion such that the carrier and saddle are constrained to move the same distance and remain spaced the same distance apart, and a spring device for resiliently resisting said motion.

8. An improved seat suspension device for motor cycles, and like vehicles, comprising a movable carrier, a main rider's seat mounted on said carrier, an auxiliary seat also mounted on said carrier, a rigid mounting having a bearing at a point between the two seats for mounting the carrier, and a parallel motion springing device between said carrier and the bearing on said rigid mounting means whereby the two seats are constrained to move the same distance and remain spaced the same distance apart.

9. An improved seat suspension device for motor cycles and like vehicles which is readily attachable as a unit to a vehicle, said device comprising a movable carrier, a main rider's saddle mounted on said carrier, an auxiliary seat and a foot rest mounted on said carrier, a rigid attachment bracket whereby said movable carrier and seats can be mounted as a unit on the machine, a pair of depending legs from said bracket, a pair of links connecting said movable carrier to said rigid bracket, a pair of depending legs pivoted to said links, and a second parallel pair of links connecting said latter pair of depending legs to the legs which depend from said bracket, so that a parallelogrammic link mounting means is formed between the carrier and the bracket, and a spring incorporated in said link mounting so as to resist resiliently the motion of the carrier.

In testimony whereof I affix signature.

GEORGE FREDERICK SHEPHERD.